July 29, 1958     P. MERTON     2,844,907
FISH CHUM DISPERSER
Filed Oct. 12, 1955
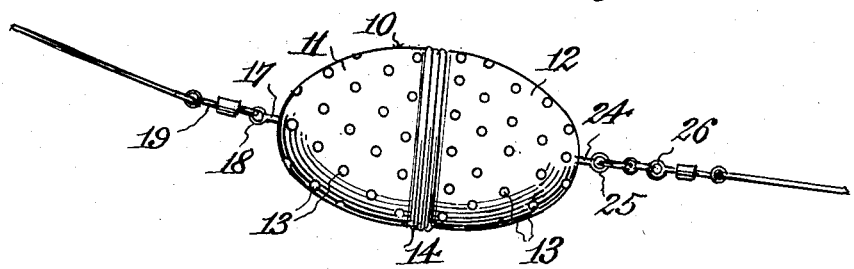
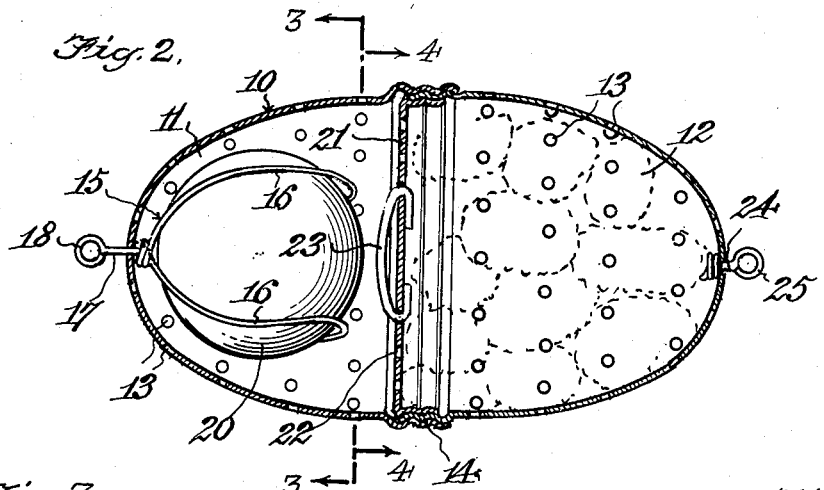
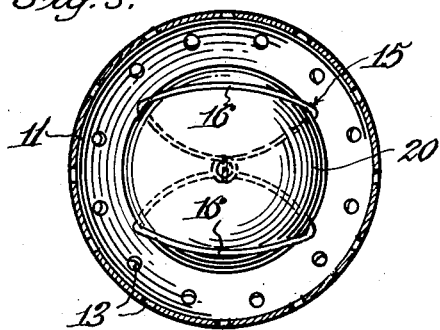
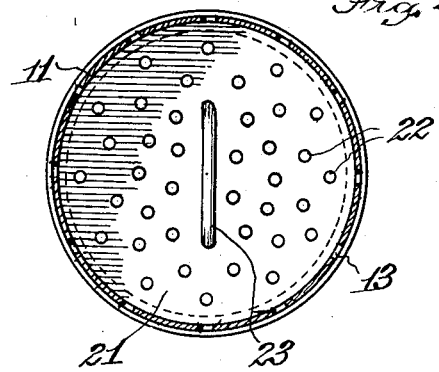
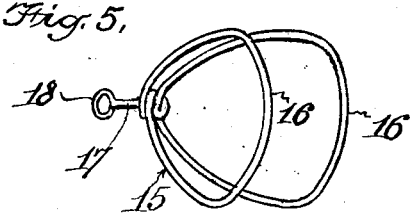
INVENTOR.
Percy Merton
BY
Munn, Liddy, Nathanson + March
ATTORNEYS

United States Patent Office 2,844,907
Patented July 29, 1958

2,844,907

FISH CHUM DISPERSER

Percy Merton, Oradell, N. J.

Application October 12, 1955, Serial No. 539,962

2 Claims. (Cl. 43—44.99)

This invention relates to a device which is designed and adapted to be used by an angler for dispersing fish-bait or chum while fishing.

An object of the present invention is the provision of a device to be used in an angler's rig that is adapted to contain fish food or chum and to function as a strainer therefor, so as to produce a chum slick which will lure or attract fish while the device is immersed or submerged in a body of water as the angler manipulates the ring.

Another object of the invention is the provision of a device of the character mentioned which is buoyant so as to be useful for surface fishing and trolling; also for bottom fishing and surf casting by the addition of a sinker slidable along the fishing line leading to the device so that when the sinker comes to rest on the bottom the device will be buoyed off the bottom and away from weeds, rocks and other obstacles to avoid snags.

A further object of this invention is to render a fish chum dispersing device buoyant by the use of a float arranged and held in such manner as to agitate the chum so that it will be more readily dissolved, and at the same time to make a plunking sound to attract fish, by jerking on that length of the fishing line running from the angler's hand or rod to the dispersing device.

Other objects and advantages of this invention will appear when the following specification is read in conjunction with the accompanying drawing, in which—

Fig. 1 is a side view of a chum dispersing device embodying the present invention and showing portions of a fishing line connected therewith.

Fig. 2 is an enlarged longitudinal sectional view of the chum dispersing device.

Fig. 3 is a cross sectional view, the section being taken on the line 3—3 of Fig. 2.

Fig. 4 is a cross sectional view, the section being taken on the line 4—4 of Fig. 2.

Fig. 5 is a perspective view of the float holder detached from the chum dispersing device.

In the embodiment of the invention illustrated in the drawing by way of example, the device includes a hollow perforated body 10 comprising two separably connected parts or sections 11 and 12 respectively. The parts may be made of metal, plastic, or other suitable thin light weight material or combination of such materials. Each of the parts 11 and 12 is semi-ovoidal and has a multiplicity of small holes 13 in the wall thereof. The apposed circular edge portions at the middle of the body 10 have complemental screw threads 14 so that the parts may be connected to each other or be separated from each other to afford access to the interior of the parts.

The part 11 considered to be the upper part of the body 10 carries a holder 15 arranged within the part 11. The holder 15 is made of a length of spring wire bent upon itself to provide cooperative spring clamping members 16 to which is connected or which has integral therewith a link 17 having an eye 18 disposed exteriorly of the part 11. The link 17 extends loosely through the wall of the part 11 and enables the holder 15 to be reciprocated and to turn with respect to the part 11. To the eye 18 is connected a swivel 19 which is connected with one end of a fishing line running to the rod, or rod and reel of the angler's rig.

A float 20 is removably retained within the part 11 by the clamping members 16 of the holder 15. The float 20 is in the form of a hollow ball which may be made of metal, celluloid or plastic. If desired use may be made of a cork float.

The part 12, considered to be the lower part of the body 10 has a removable stopper or closure member 21 which is disposed at the middle of the body 10 when the parts 11 and 12 are connected to each other. The member 21 is in the form of a disk with a circular flange threaded for engagement with the threads 14 of the part 12. Holes 22 in the disk portion of the member 21 establish communication between the interior of the parts 11 and 12, and a bail 23 on said disk portion is used in screwing the member 21 into and out of the normally open end of the part 12. A link 24 is carried by the part 12 at the small end of the latter in axial alinement with the link 17. The link 24 has an eye 25 disposed exteriorly of the part 12. One end of a swivel 26 is connected with the eye 25 and its opposite end has connected therewith a length of fishing line having a hook or hooks thereon.

The part 12 is adapted to contain a mixture of fish food or chum which dissolves or disintegrates when water passes through the holes in the body 10 and produces a chum slick in the water in which it is immersed thereby luring or attracting fish to the baited hook or hooks.

The float 20 in the holder 15 performs the following functions. It renders the device buoyant for surface fishing or trolling; produces a plunking sound by striking the closure member 21 when the fishing line running to the rod or hand of the angler is jerked thereby attracting fish; serves to agitate the fish food or chum in the part 12 to thoroughly disperse the same; and buoys the device up at an angle when a sinker slidable on a portion of the fishing line leading to the device rests on the water bottom thereby lessening the number of snags.

The links 17 and 24 enable the device to rotate or roll freely when attached to the fishing line. Consequently streams of chum slick will flow in many directions as a means for luring or attracting fish.

It is to be understood that the invention is not restricted to the embodiment thereof illustrated and described, and that details of construction may be modified and rearranged in accordance with the scope of the invention as defined in the appended claims.

I claim:

1. A chum dispenser comprising a pair of upper and lower hollow portions separably joined at substantially the mid point of the length thereof, the lower portion having a removable closure at the upper end thereof, having fish hook connecting means at the lower end thereof and being adapted to contain chumming material, the upper portion having an aperture at the upper end thereof, a clamping member within said upper portion having an extension adapted to receive a fish line attaching means, said extension extending through the aperture and being reciprocatable therein, the clamping member having an articulated extension within the upper portion having opposed flexible loop members adapted to clamp and hold a float member therebetween whereby the float member may be forced to reciprocate by jiggling the fish line and contact the closure for the lower portion or may pivot about said articulation and contact the wall of the upper portion to thereby agitate the chumming material in said lower portion and to create noises which may attract fish.

2. A chum dispenser comprising a pair of upper and lower hollow portions separably joined at substantially the mid point of the length thereof, the lower portion being perforated and having a removable perforated closure wall at the upper end thereof, having fish-hook connecting means at the lower end thereof and being adapted to contain chumming material, the upper portion having an aperture at the upper end thereof, a clamping member within said upper portion having an extension adapted to receive a fish line attaching means, said extension extending through the aperture and being loose and reciprocable therein, the clamping member being movable sidewise in said upper portion and having with said portion opposed flexible loop members adapted to clamp and hold a float member therebetween whereby the float member may be forced to reciprocate by jiggling the fish line and contact the closure wall for the lower portion or may shift sidewise with said clamping member and contact the wall of the upper portion to thereby agitate the chumming material in said lower portion and to create noises which may attract fish.

References Cited in the file of this patent

UNITED STATES PATENTS

| | | |
|---|---|---|
| 2,612,718 | Steinberg | Oct. 7, 1952 |
| 2,634,540 | Nelson et al. | Apr. 14, 1953 |
| 2,665,511 | Bradberry | Jan. 12, 1954 |
| 2,709,317 | Pease | May 31, 1955 |
| 2,713,744 | Strausser | July 26, 1955 |

FOREIGN PATENTS

| | | |
|---|---|---|
| 981,789 | France | Jan. 17, 1951 |
| 1,094,372 | France | Dec. 8, 1954 |